(12) United States Patent
Oravivattanakul et al.

(10) Patent No.: US 10,579,445 B2
(45) Date of Patent: Mar. 3, 2020

(54) DYNAMIC ROUTING OF EVENTS TO DESTINATIONS

(71) Applicant: salesforce.com, inc., San Francisco, CA (US)

(72) Inventors: Choapet Oravivattanakul, San Francisco, CA (US); Samarpan Jain, Fremont, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 21 days.

(21) Appl. No.: 15/947,656

(22) Filed: Apr. 6, 2018

(65) Prior Publication Data

US 2019/0310899 A1   Oct. 10, 2019

(51) Int. Cl.
*G06F 9/54* (2006.01)
*G06F 21/62* (2013.01)
*H04L 29/08* (2006.01)

(52) U.S. Cl.
CPC .............. *G06F 9/542* (2013.01); *G06F 9/544* (2013.01); *G06F 9/546* (2013.01); *G06F 21/6218* (2013.01); *H04L 67/10* (2013.01); *G06F 2209/541* (2013.01)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman | |
| 8,326,937 B1 * | 12/2012 | Stark | |
| 9,417,840 B2 | 8/2016 | Pradeep et al. | |
| 9,632,849 B2 | 4/2017 | Pradeep et al. | |
| 9,658,801 B2 | 5/2017 | Pradeep et al. | |
| 9,767,022 B2 | 9/2017 | Pradeep et al. | |
| 9,767,040 B2 | 9/2017 | Pradeep et al. | |
| 2006/0259563 A1 * | 5/2006 | Stark | |
| 2015/0199366 A1 * | 7/2015 | Marlatt | |
| 2016/0357739 A1 * | 12/2016 | Rathinagiri | |

* cited by examiner

*Primary Examiner* — Syed A Roni
(74) *Attorney, Agent, or Firm* — NWDE LLP (57) ABSTRACT

A method for dynamically routing of events to destinations based on mapping metadata is described. The method includes detecting, by a capture service of an application server, an event associated with values for one or more attributes that describe the event; mapping, by a metadata service of the application server, the event to a set of destinations based on the mapping metadata received by the application server at runtime, the values of the one or more attributes of the event, and permissions associated with a tenant; and storing, by a buffer of the application server, the event and the set of destinations.

17 Claims, 8 Drawing Sheets

MAPPING METADATA
112

ATTRIBUTES
301

| EVENT TYPE 301A | LOCATION 301B | PERMISSIONS 303 | SET OF DESTINATIONS 305 |
|---|---|---|---|
| LOGIN EVENT | TEXAS | PERMISSIONS A | {DATA STORE, MESSAGE QUEUE} |
| LOGIN EVENT | TEXAS | PERMISSIONS B | {DATA STORE} |
| API EVENT | CALIFORNIA | PERMISSIONS B | {MESSAGE QUEUE} |
| API EVENT | CALIFORNIA | PERMISSIONS C | {DATA STORE} |

DYNAMIC ROUTING OF EVENTS TO DESTINATIONS

TECHNICAL FIELD

One or more implementations relate to the field of event management; and more specifically, to dynamically configuring the processing and routing of events associated with different tenants such that events may be delivered to different destinations.

BACKGROUND

An event is an action or occurrence that may be captured by a computing system. Examples of events include logging into a system, running a report, executing an Application Programming Interface (API), or other occurrences. For instance, a client application running on or otherwise accessible by a client device may include a user interface layer that presents a user interface. Through selection of a user interface element, a user of a client device may initiate some processing operation in a logical layer of the client application that reaches a hard limit (e.g., a number of processing cycles consumed per day or an amount of storage resources consumed) and page rendering is stopped. The reaching of this hard limit may trigger the creation of an event by the client application, which is recorded for possible future review.

In some cases, events generated by a client application and a corresponding client device are recorded by a multi-tenant system. A multi-tenant system is a system in which various elements of hardware and software may be shared by one or more tenants. For example, a given application server may process and provide access to events generated by client devices and associated with any number of tenants. In this multi-tenant system, processing of events is defined at compile time and is common to all events. Thus, a first event of a first type from a first client device and with a first set of associated permissions undergoes the same processing and is delivered to the same data stores (either for long term storage or for streaming) as a second event of a second type from a second client device and with a second set of associated permissions. This is often an inefficient use of both processing and storage resources as tenants typically utilize events differently (i.e., require different processing for delivery to different destinations). For instance, using the example above, a first tenant associated with or otherwise interested in the first event may want the first event routed only to a destination for long-term storage, while a second tenant associated with or otherwise interested in the second event may want the second event routed only to a destination for short-term storage (i.e., for stream processing). Since traditional systems require events to be treated in the same manner, both the first event and the second event will at least be processed and routed to both long-term and short-term storage destinations. By requiring both the first event and the second event to be processed and routed to both long-term and short-term storage destinations, which is at least partially contrary to the needs of the first and second tenants, processing and storage resources are inefficiently utilized in these systems. Further, since configuration of processing and routing is determined at compile time, any changes to the needs of either the first or second tenant requires recompilation of the system.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
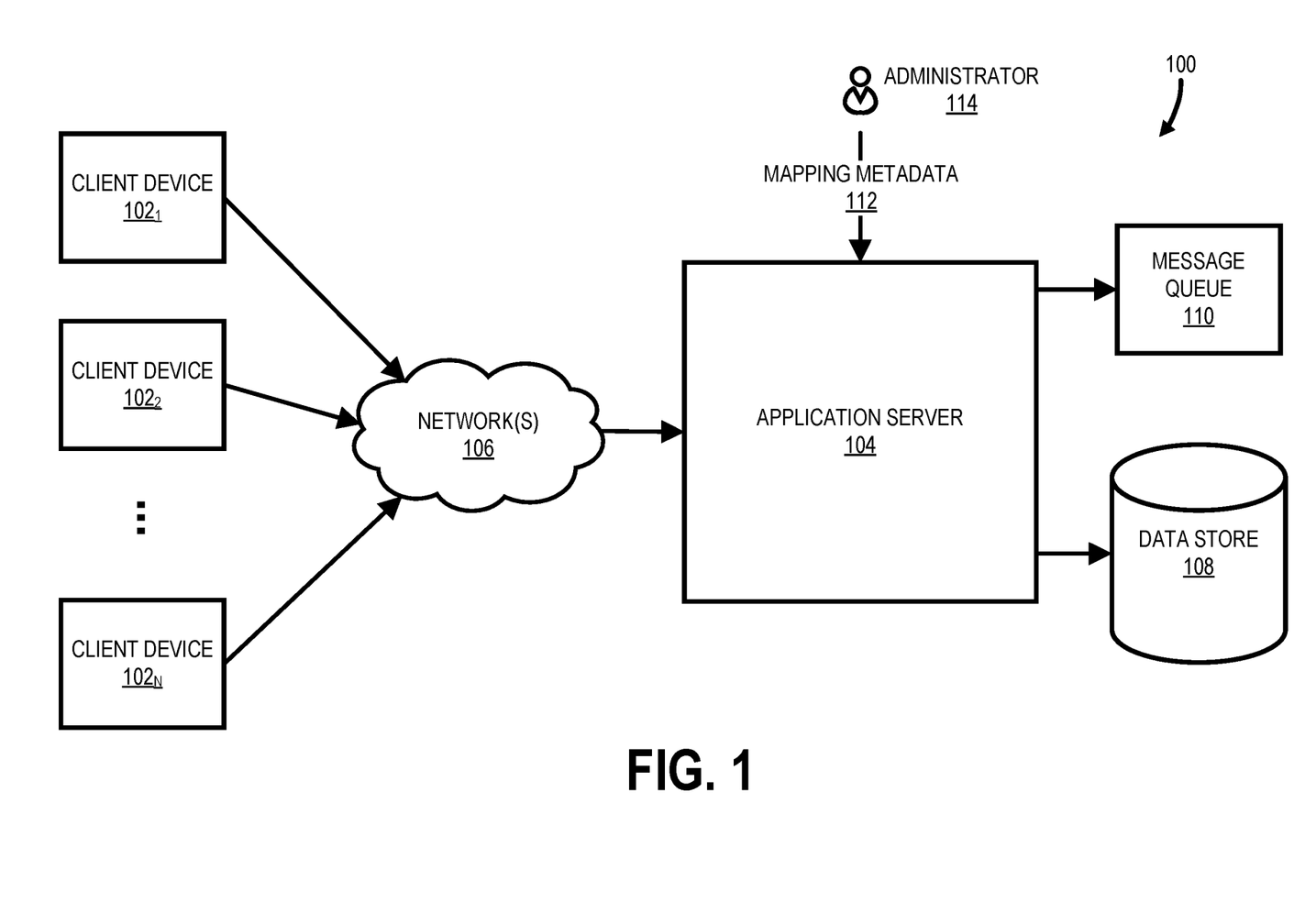
FIG. 1 shows a block diagram illustrating a computing environment, including an application server, according to one example implementation.

FIG. 1 is a block diagram illustrating a computing environment 100, according to one example implementation. The computing environment 100 includes client devices $102_1$-$102_N$ (where N≥2), an application server 104, a set of networks 106, a data store 108, and a message queue 110. The computing environment 100 processes events associated with the client devices $102_1$-$102_N$ based on mapping metadata 112 such that each event may be dynamically routed to a set of destinations (i.e., one or more destinations). In particular, the mapping metadata 112 includes mappings of attributes of events (sometimes referred to as the context of an event) and permissions of tenants to sets of destinations (e.g., data store 108 and/or message queue 110). For example, the mapping metadata 112 may indicate a login event (where the type of the event being a login event is the set of attributes) may be processed for a tenant by a first set of consumer nodes for delivery to a first set of destinations (e.g., the data store 108 and the message queue 110) when the tenant is associated with a first set of permissions (i.e., the first set of permission are enabled or conditions of the first set of permissions are met). In contrast, the login event may be processed by a second set of consumer nodes for delivery to a second set of destinations (e.g., the data store 108) when the tenant is associated with a second set of permissions (i.e., the second set of permission are enabled or conditions of the second set of permissions are met). In one implementation, the mapping metadata 112 may be configured and/or delivered to the application server 104 from an administrator 114 of the computing environment 100 and/or the application server 104 at runtime of the application server 104. In this fashion, processing and routing of events by the application server 104 may be dynamically customized based on event attributes and tenant permissions to meet the needs of various tenants. For example, a first tenant may be interested in login events and may require these events to be stored in data store 108 and the message queue 110 for further processing (e.g., the data store 108 is used for long-term processing of events and the message queue 110 is used for short-term or stream processing of events). In contrast, a second tenant may be interested in login events as well, but unlike the first tenant, may only require these events to be routed and stored in data store 108 for further processing. By adjusting permissions associated with each of the first and second tenants, the application server 104 may individualize processing, routing, and storage of events according to the set of destinations listed in the mapping metadata 112. Accordingly, the application server 104 reduces needless processing, routing, and storage of events while still dynamically meeting the diverse needs of various tenants.

Although described in relation to tenant permissions, in other embodiments another variable may be used for dynamically configuring the processing and storage of events. In particular, other rules and conditions associated with the tenant may be used for mapping events to destinations. For example, in one embodiment, features/products associated with a tenant may be used for controlling mapping of events to destinations (e.g., features/products purchased by tenants). Accordingly, the use of permissions is for illustrative purposes rather than limiting.

As shown in FIG. 1, the client devices $102_1$-$102_N$ and the application server 104 may be connected through a series of one or more networks 106. The set of networks 106 may be, for example, a local area network (LAN), a wide area network (WAN), a global area network (GAN), such as the Internet, or a combination of such networks. In another implementation, the client devices $102_1$-$102_N$ and the application server 104 may maintain a direct connection to each other.

Each of the client devices $102_1$-$102_N$ may be a computing system that may be operated by one or more users. For example, each of the client devices $102_1$-$102_N$ may be a personal computer (PC), a workstation, a laptop computer, a tablet computer, a mobile phone, a smartphone, a personal digital assistant (PDA) or the like. The client devices $102_1$-$102_N$ may communicate with the application server 104 to access resources, such as one or more client applications operating on the application server 104.

The client devices $102_1$-$102_N$ may each be associated with one or more organizations/tenants. For example, client devices $102_1$ and $102_2$ may be customers of a first organization/tenant and client device $102_N$ may be a customer of a second organization/tenant. Organizations/tenants may be any company, firm, corporation, institution, association, society, etc.

In one implementation, the application server 104 may be any computing device that provides access to resources to the client devices $102_1$-$102_N$. For example, the application server 104 may be a multi-tenant server that provides the client devices $102_1$-$102_N$ access to the one or more client applications. The client applications and other resources provided by application server 104 (e.g., processing resources, storage resources, etc.) may be maintained by the application server 104 and made available to users of client devices $102_1$-$102_N$ as needed (i.e., "on-demand").

The application server 104 may include various elements of hardware and software of a multi-tenant database system. As used herein, the term "multi-tenant database system" refers to those systems in which various elements of hardware and software of the database system may be shared by one or more tenants. For example, the application server 104 may simultaneously process requests for a great number of tenants, and a given database table may store records for a potentially much greater number of tenants. The application server 104 may include an application platform including a framework that allows applications to execute, such as the hardware or software infrastructure of the system. In one implementation, the application platform enables the creation, management, and execution of one or more applications, such as the one or more client applications, developed by the provider of the application server 104, customers accessing the application server 104 via client devices $102_1$-$102_N$, or third-party application developers.

As noted above and as will be described in greater detail below, the application server 104 may determine a set of destinations for each detected event based on the mapping metadata 112. The set of destinations for each event may include a set of storage locations. For example, as shown in FIG. 1, a set of destinations for a detected event may include the data store 108 and the message queue 110. In one implementation, the data store 108 may provide long-term storage of events (i.e., events are stored for some time period before being processing by or on behalf of one or more tenants), while the message queue 110 may provide temporary/short-term storage for events (i.e., events are streamed for processing in real-time or near real-time by or on behalf of one or more tenants). In one implementation, the data store 108 and the message queue 110 each provide an application programming interface (API) which can be called by other elements of the application server 104 (e.g., an in-memory buffer service and/or a customer executor service) to store events in data store 108 and the message queue 110, respectively. In one implementation, the data store 108 may be an open source, non-relational, distributed database such as Apache HBase®, Bigtable, MongoDB®, or other data store. In some implementations, the message queue 110 may be any available in-memory or out-of-memory data structure that can temporarily accommodate events before they are stored in data store 108. In some implementations, the message queue 110 may be a database such as Kafka®, RabbitMQ®, ActiveMQ®, or a similar system. Although described in relation to two destinations (e.g., the data store 108 and the message queue 110), in other implementations, the computing environment 100 may include additional or other possible destinations for routing events.

Figure 2:
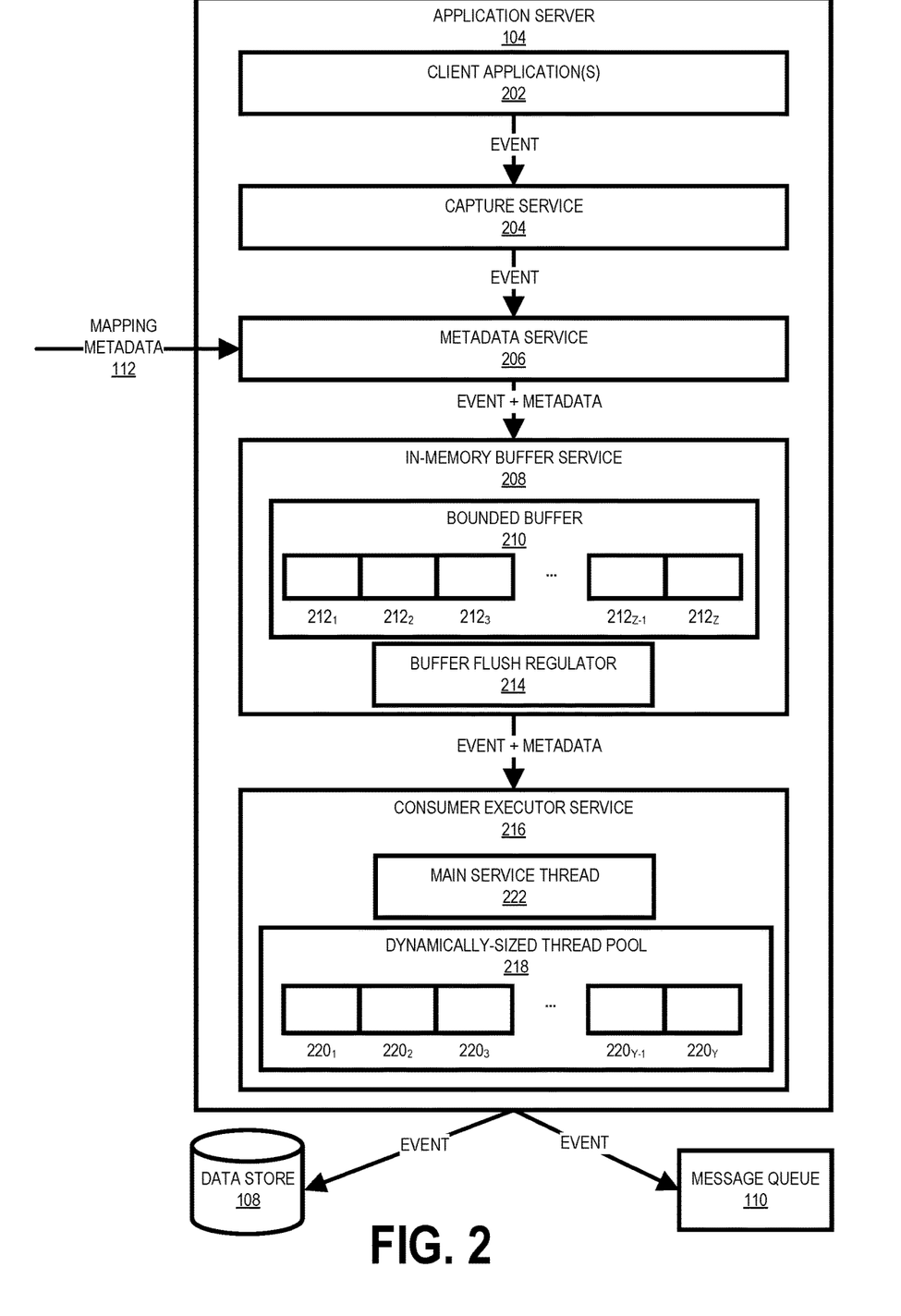
FIG. 2 shows a more detailed view of the application server, according to one example implementation.

Turning to FIG. 2, a more detailed view of the application server 104 will now be described. Although shown with a certain set of elements, the example application server 104 shown in FIG. 2 is for illustrative purposes and in other implementations, the application server 104 may include more or fewer elements than those shown.

As shown in FIG. 2, the application server 104 may include one or more client applications 202. The client applications 202 may be any type of computer application program that generates events. For example, a client application 202 may be an entertainment application, productivity application, business application, social networking application or other type of application.

In one implementation, the one or more client applications 202 may generate events based on interactions/communications with a client device $102_1$-$102_N$ and/or with a user of the client device $102_1$-$102_N$. In some implementations, an application or service running on a client device $102_1$-$102_N$ may interact with a client application 202 and, based on this interaction, an event may be generated. An event is an action or occurrence that may be captured by a computing system. Examples of events include logging into a system, running a report, executing an API, or other occurrences. For instance, a client application 202 running on or otherwise accessible by the client device $102_1$ (e.g., accessible via a web browser running on the client device $102_1$) may include a user interface layer that presents a user interface. Through selection of a user interface element, a user of the client device $102_1$ may initiate some processing operation in a logical layer of the client application 202 that reaches a hard limit (e.g., a number of processing cycles consumed per day or an amount of storage resources consumed) and page rendering is stopped. The reaching of this hard limit may trigger the creation of an event by the client application 202, which is detected and/or recorded/captured for possible review/processing.

In one implementation, the application server 104 may include a capture service 204. The capture service 204 detects/receives and/or records/captures events from the one or more client applications 202. In one implementation, the client applications 202 transmit events as they occur to the capture service 204 (i.e., a client application 202 pushes the events to the capture service of the application server 104). In another implementation, the capture service 204 retrieves events from the client application 202 (i.e., the capture service 204 pulls events from the client application 202 at a prescribed interval (e.g., every three seconds)).

In one implementation, an event is defined by a set of attributes (sometime referred to as a context of the event). For example, the set of attributes may include an event type (e.g., an Application Programming Interface (API) event, a login event, etc.) and a location (e.g., a geographic location from which the event was generated). Accordingly, capturing an event may include capturing/recording/storing a set of attributes that describe the event.

Following receipt of a set of events (i.e., one or more events), the set of events may be processed by a metadata service 206 along with sets of permissions associated with tenants. The metadata service 206 examines each event (e.g., attributes of each event) along with sets of permissions associated with tenants and determines a set of destinations for each event (i.e., one or more destinations). The determination of a set of destinations for each event may be based on the mapping metadata 112. The mapping metadata 112 may be configured by an administrator 114 of the application server 104 and provided/input to the metadata service 206 at runtime of the application server 104. As noted above, the mapping metadata 112 may include mappings between sets of attributes (e.g., an event type), sets of permissions associated with tenants, and a set of destinations (e.g., the data store 108 and/or the message queue 110).

Figure 3:
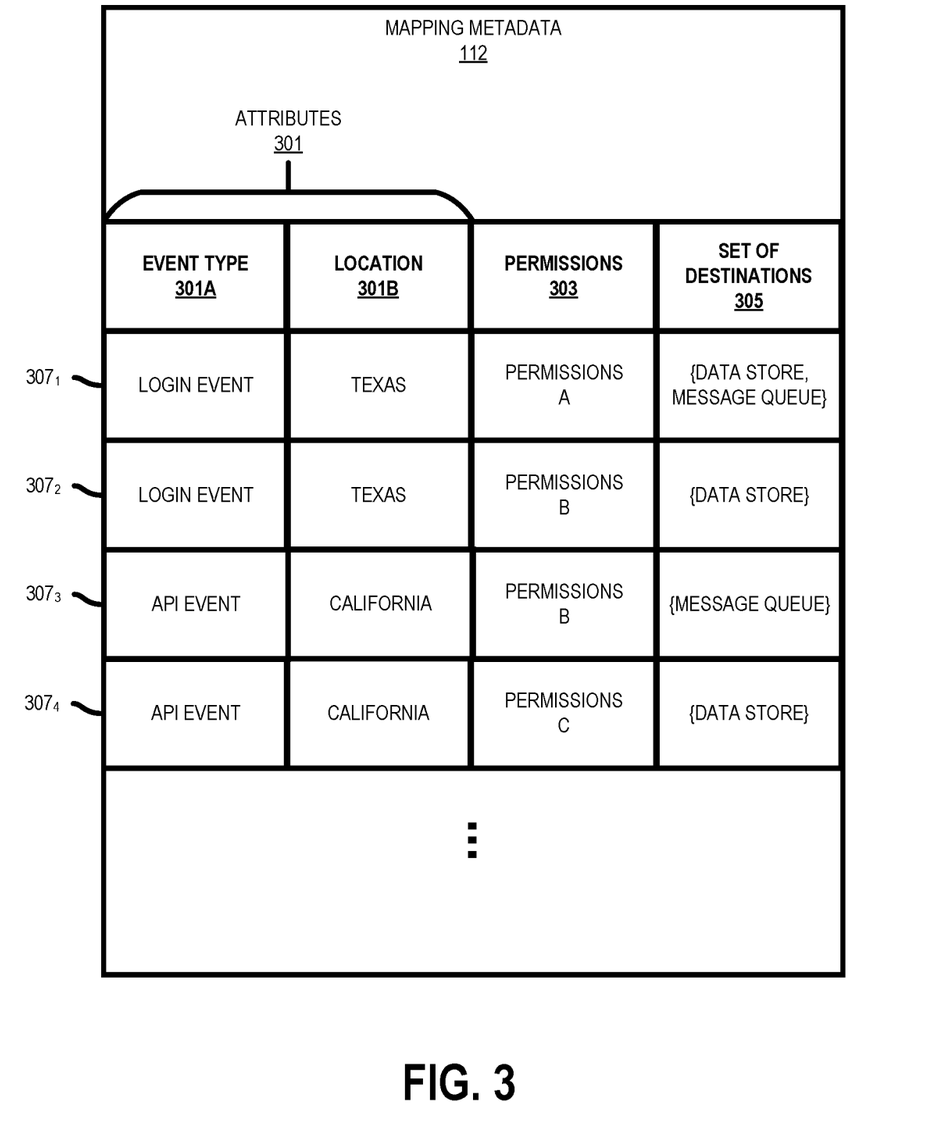
FIG. 3 shows example mapping metadata, according to one example implementation.

FIG. 3 shows example mapping metadata 112 according to one implementation. As shown in FIG. 3, values for a set of attributes 301, which describe events, and permissions 303, which are associated with tenants, are together associated with sets of destinations 305. For example, as noted above, the set of attributes 301 may include an event type 301A (e.g., an API event, a login event, etc.) and a location 301B (i.e., a geographic location from which the event was generated). The permissions 303 are associated with tenants and indicate routing/storage locations for events. Each set of destinations 305 may correspond to locations the event will be routed/stored once the event has been processed by the application server 104. In the example computing environment 100 of FIG. 1, the set of destinations 305 for each set of attributes 301 and permissions 303 corresponds to some permutation of the data store 108 and the message queue 110.

FIG. 3 shows four entries $307_1$-$307_4$ in the example mapping metadata 112; however, in other implementations, the mapping metadata 112 may have any number of entries 307. Each entry $307_1$-$307_4$ in the example mapping metadata 112 includes values for each of the attributes 301, permissions 303, and sets of destinations 305. For example, entry $307_1$ corresponds to a login event (i.e., event type 301A=login event) that is generated in the state of Texas (i.e., location 301B=Texas) with permissions A (i.e., permissions 303=permissions A). These values for the attributes 301A-301B and the set of permissions 303 of entry $307_1$ correspond to data store 108 and message queue 110 (i.e., set of destinations 305={data store 108, message queue 110}). In contrast, entry $307_2$ corresponds to a login event (i.e., event type 301A=login event) that is generated in the state of Texas (i.e., location 301B=Texas) with permissions B (i.e., permissions 303=permissions B). These values for the set of attributes 301A-301B and the set of permissions 303 of entry $307_2$ correspond to data store 108 (i.e., set of destinations 305={data store 108}).

Although shown in a table, the mapping metadata 112 may be represented in any format or data structure that may be parsed by a computing device. For example, in one implementation, the mapping metadata 112 may be represented in an Extensible Markup Language (XML) file, a Comma-Separated Values (CSV) file, or a JavaScript Object Notation (JSON) file.

In one implementation, the metadata service 206 determines a set of attribute values for an event received from the capture service 204 along with permission values corresponding to tenants and maps those attribute and permission values to a set of destinations based on the mapping metadata 112. For example, using the example mapping metadata 112 shown in FIG. 3, for a login event (i.e., event type 301A=login) that is generated in Texas (i.e., location 301B=Texas), the set of destinations 305 for this event consists of data store 108 and message queue 110 for a tenant with permissions A (i.e., permissions 303=permissions A). In particular, this example event corresponds to the entry $307_1$ in the example mapping metadata 112 of FIG. 3. For a login event (i.e., event type 301A=login) that is generated in Texas (i.e., location 301B=Texas), the set of destinations 305 for this event consists of data store 108 for a tenant with permissions B (i.e., permissions 303=permissions B). In particular, this example event corresponds to the entry $307_2$ in the example mapping metadata 112 of FIG. 3. These entries $307_1$ and $307_2$ in the example set of mapping metadata 112 of FIG. 3 exemplify how an event may be treated differently (i.e., differently routed for storage) based on attributes 301 (i.e., a context) of the event and/or permissions associated with a tenant. Accordingly, the application server 104 may provide customized processing, routing, and storage per the needs of various tenants. For instance, in the example provided above, the entry $307_1$ may correspond to a first tenant (i.e., the first tenant is interested in events that match the values for the set attributes 301 of the entry $307_1$ and is associated with permissions A) and the entry $307_2$ may correspond to a second tenant (i.e., the second tenant is interested in events that match the values of the set of attributes 301 of the entry $307_2$ and is associated with permissions B). Further, since tenants may change their associated permissions 303 at runtime of the application server 104, the mapping of events associated with tenants may be dynamically adjusted without the need to recompile any component of the application server 104.

Figure 4:
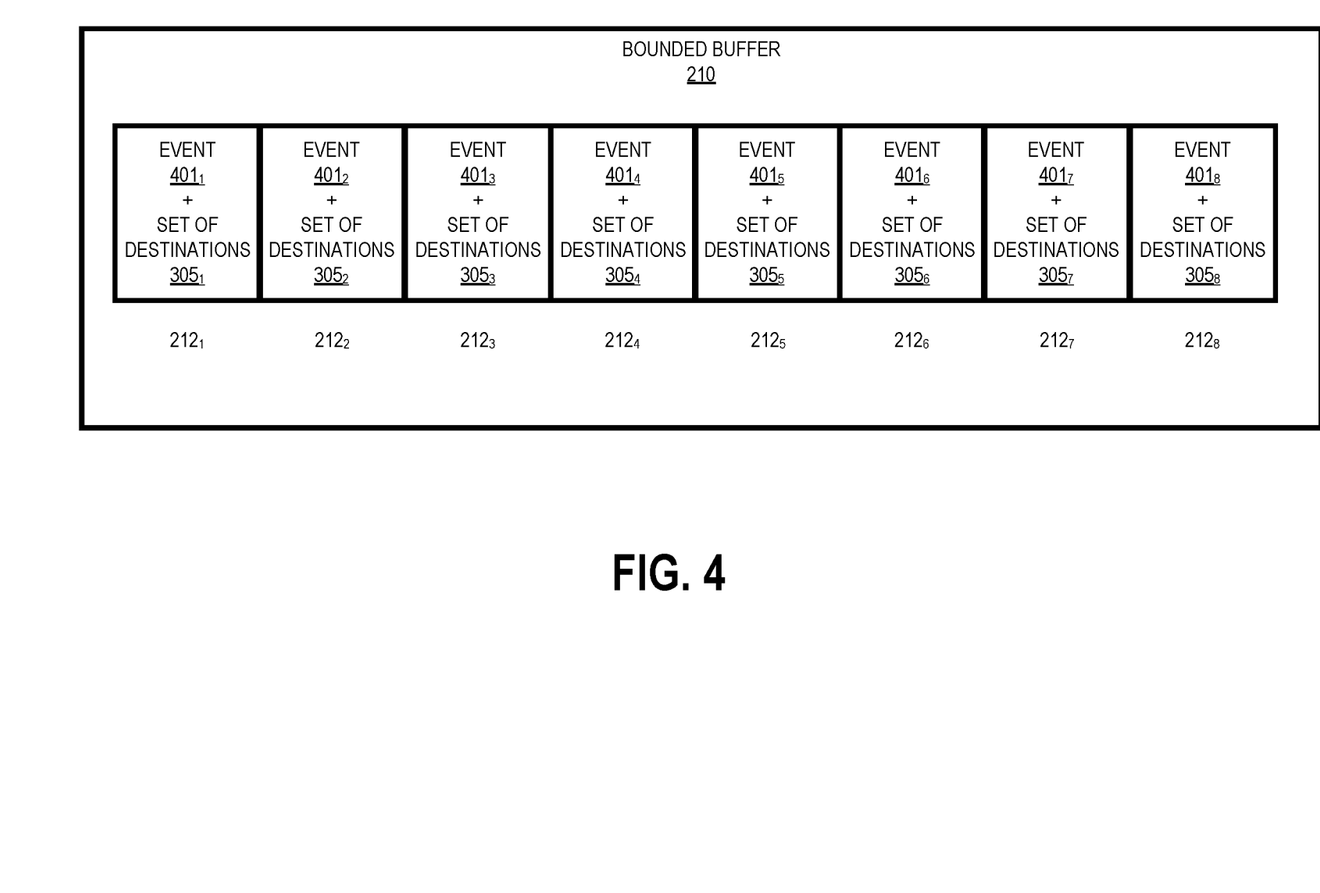
FIG. 4 shows sets of events stored along with corresponding sets of destinations in respective single-threaded segments, according to one example implementation.

In view of the mapping provided by the metadata service 206 based on the mapping metadata 112, the metadata service 206 may append, add, or otherwise associate sets of destinations 305 to/with events as shown in FIG. 4. For example, a single data structure may include values for the set of attributes 301 that define the event along with an associated set of destinations 305.

In one implementation, the application server 104 includes in-memory buffer service 208. The in-memory buffer service 208 ingests and processes events generated by client application 202 and processed by the metadata service 206, buffers those events, and eventually stores the events in a set of destinations (e.g., the data store 108 and/or the message queue 110). The volume at which such events are potentially generated and conventional means for recording and storing these events may result in an unacceptable level of latency. The buffering of the events in the in-memory buffer service 208 before final storage allows a high volume of events to be processed in near real-time with minimal latency and without adversely affecting performance of the application server 104 or a client application 202. In particular, the in-memory buffer service 208 routes/transports events to final destinations in a manner that is independent and least disruptive to existing event flows in terms of both latency and failure rates. Accordingly, users of client applications 202 will not be delayed by processing of events.

In one implementation, the metadata service 206 temporarily stores processed events, including associated sets of destinations 305, in a bounded buffer 210 of the in-memory buffer service 208. The bounded buffer 210 may include a plurality of single-threaded segments 212, to which the metadata service 206 can write the events and corresponding sets of destinations 305 in parallel. For example, as shown in FIG. 2, the bounded buffer 210 may include single-threaded segments $212_1$-$212_Z$, where $Z \geq 2$. In one implementation, a bounded buffer 210 may include sixteen single-threaded segments 212 (i.e., Z=16), each of which can be written in parallel with a different event and corresponding set of destinations received from the metadata service 206. The size of the bounded buffer 210 is configurable according to the particular implementation. In one implementation, the size of the bounded buffer 210 may be approximately 10 megabytes (MB) to 20 MB. In other implementations, the bounded buffer 210 may have a different size, such as 1 MB, 50-100 MB, 1 terabyte (TB), etc.

FIG. 4 shows a set of events $401_1$-$401_8$ stored along with corresponding sets of destinations $305_1$-$305_8$ in respective single-threaded segments $212_1$-$212_8$. As noted above, the sets of destinations $305_1$-$305_8$ for the events $401_1$-$401_8$ correspond to destinations/locations to which the events will be routed. Accordingly, in some implementations, one set of destinations $305_1$-$305_8$ may be identical to one or more other set of destinations $305_1$-$305_8$. For example, set of destinations $305_2$ may indicate the data store 108 while the set of destinations $305_6$ also indicates the data store 108.

As noted above, events 401 may be represented by values for the set of attributes 301. For example, each of the events $401_1$-$401_8$ may include values for an event type 301A and a location 301B along with other associated information, including an associated tenant identifier. The sets of destinations 305 may be represented by identifiers for one or more destinations. For example, each of the sets of destinations $305_1$-$305_8$ may include one or more identifiers of the data store 108 and/or the message queue 110.

In one implementation, the in-memory buffer service 208 includes a buffer flush regulator 214. The buffer flush regulator 214 controls when the bounded buffer 210 is emptied (i.e., "flushed") for consumption by a consumer executor service 216 for storage in a set of destinations (e.g., the data store 108 and/or the message queue 110). In one implementation, logic associated with bounded buffer 210 monitors the load on the bounded buffer 210 and provides a notification to the buffer flush regulator 214 when the number of events 401 and corresponding sets of destinations 305 stored in the bounded buffer 210 reaches a predefined limit (e.g., 80% full) or when a predefined amount of time has passed since the contents of the bounded buffer 210 were last flushed to the consumer executor service 216 (e.g., ten seconds).

In some situations, all of the segments 212 of the bounded buffer 210 may be filled with events 401 and corresponding set of destinations 305 (e.g., as shown in FIG. 4) while new events 401 are received by capture service 204 and processed by the metadata service 206, and before buffer flush regulator 214 can empty the contents of bounded buffer 210. The bounded buffer 210 may handle this situation in a number of different ways according to a defined overflow policy. In one implementation, the bounded buffer 210 may implement a "keep latest" overflow policy where the oldest event 401 and set of destinations 305 in the bounded buffer 210 is overwritten with the newly received event 401 and set of destinations 305 from the metadata service 206. In another implementation, the bounded buffer 210 may implement a "drop latest" overflow policy, where the newly received event 401 and set of destinations 305 is prevented from being stored in the bounded buffer 210.

In one implementation, consumer executor service 216 periodically sends a request for buffer flushing to buffer flush regulator 214. The buffer flush regulator 214 determines whether a notification has been received from the bounded buffer 210 indicating that either the predefined size limit or the predefined time limit has been reached. If not, the buffer flush regulator 214 delays the request. Accordingly, if the buffer flush regulator 214 has not received any notification from the bounded buffer 210, then buffer flush regulator 214 ignores the consumer executor service 216 until the buffer flush regulator 214 receives a notification indicating either the predefined size limit or the predefined time limit has been reached. If the notification has been received, buffer flush regulator 214 grants the request and consumer executor service 216 may consume the events 401 and sets of destinations 305 in the bounded buffer 210 using a dynamically sized thread pool 218 of consumer threads 220 to read the segments 212 of the bounded buffer 210 in parallel. By consuming the events 401 and set of destinations 305, the consumer executor service 216 reads the events 401 and sets of destinations 305 from the bounded buffer 210 for processing by the consumer threads 220 and eventual routing and storage in a set of destinations (e.g., the data store 108 and/or the message queue 110).

As described above, the consumer executor service 216 may consume events 401 and corresponding sets of destinations 305 in the bounded buffer 210 using a dynamically sized thread pool 218 of consumer threads 220 to read the segments 212 of the bounded buffer 210 in parallel. Dynamically sized thread pool 218 can add or remove consumer threads 220 so that the number of consumer threads 220 matches the number of buffer segments 212 being consumed. For example, if all segments $212_1$-$212_Z$ are being read, dynamically sized thread pool 218 can have Z consumer threads $220_1$-$220_Y$ (i.e., Y=Z). If, however, only half of the buffer segments $212_1$-$212_Z$ contain events, then thread pool 218 need only include ½Z consumer threads $220_1$-$220_Y$ (i.e., Y=½Z).

Each of the consumer threads $220_1$-$220_Y$ corresponds to a particular single-threaded buffer segment $212_1$-$212_Z$. When the flush operation occurs by the buffer flush regulator 214, events 401 and sets of destinations 305 stored in one of the buffer segments $212_1$-$212_Z$ are then passed to a corresponding consumer thread $220_1$-$220_Y$. In one implementation, the main service thread 222 may assign/distribute processing of events 401 and corresponding sets of destinations 305 to consumer threads $220_1$-$220_Y$ based on a load balancing scheme.

Figure 5:
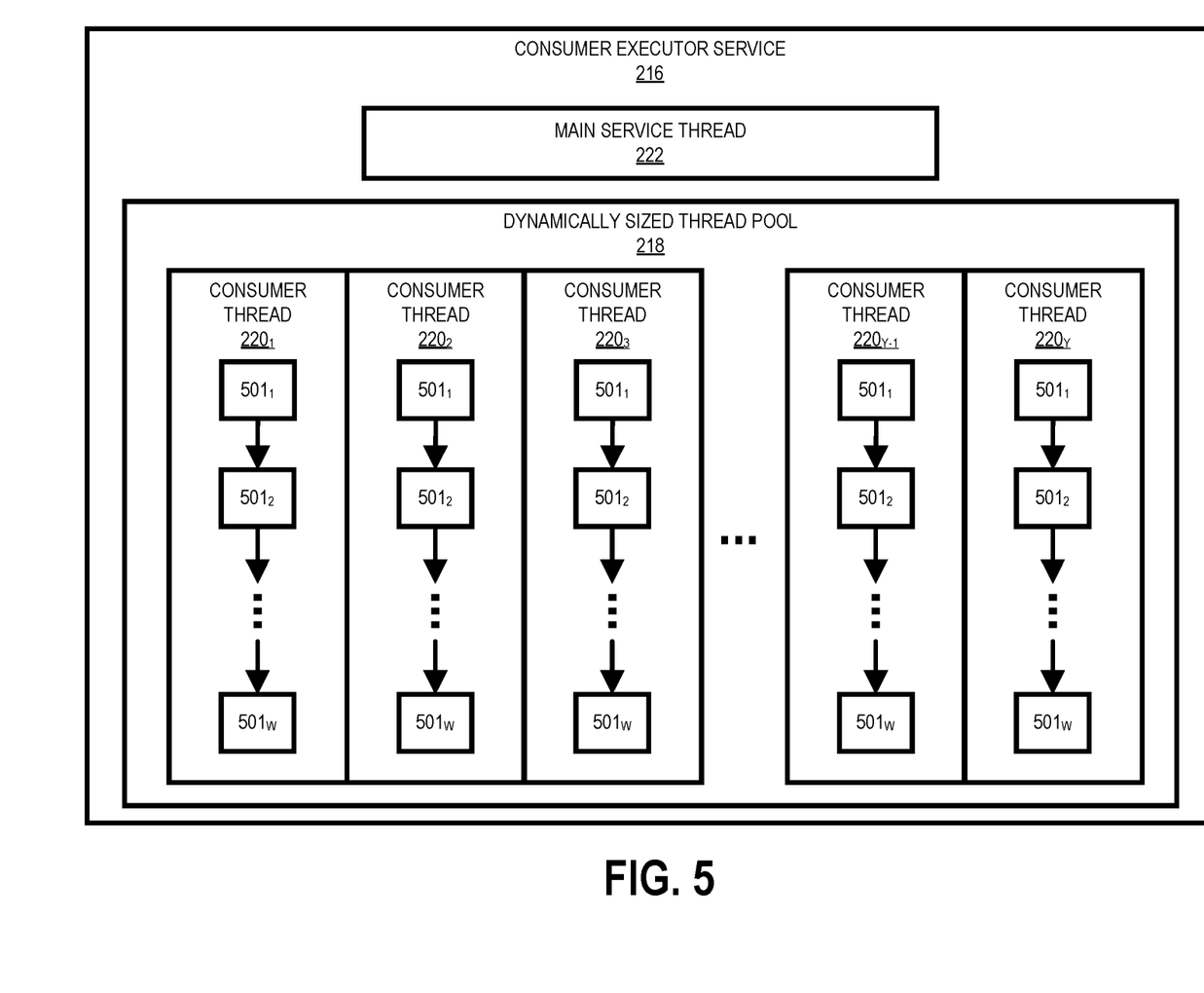
FIG. 5 shows a block diagram illustrating consumer threads, according to one example implementation.
Figure 6:
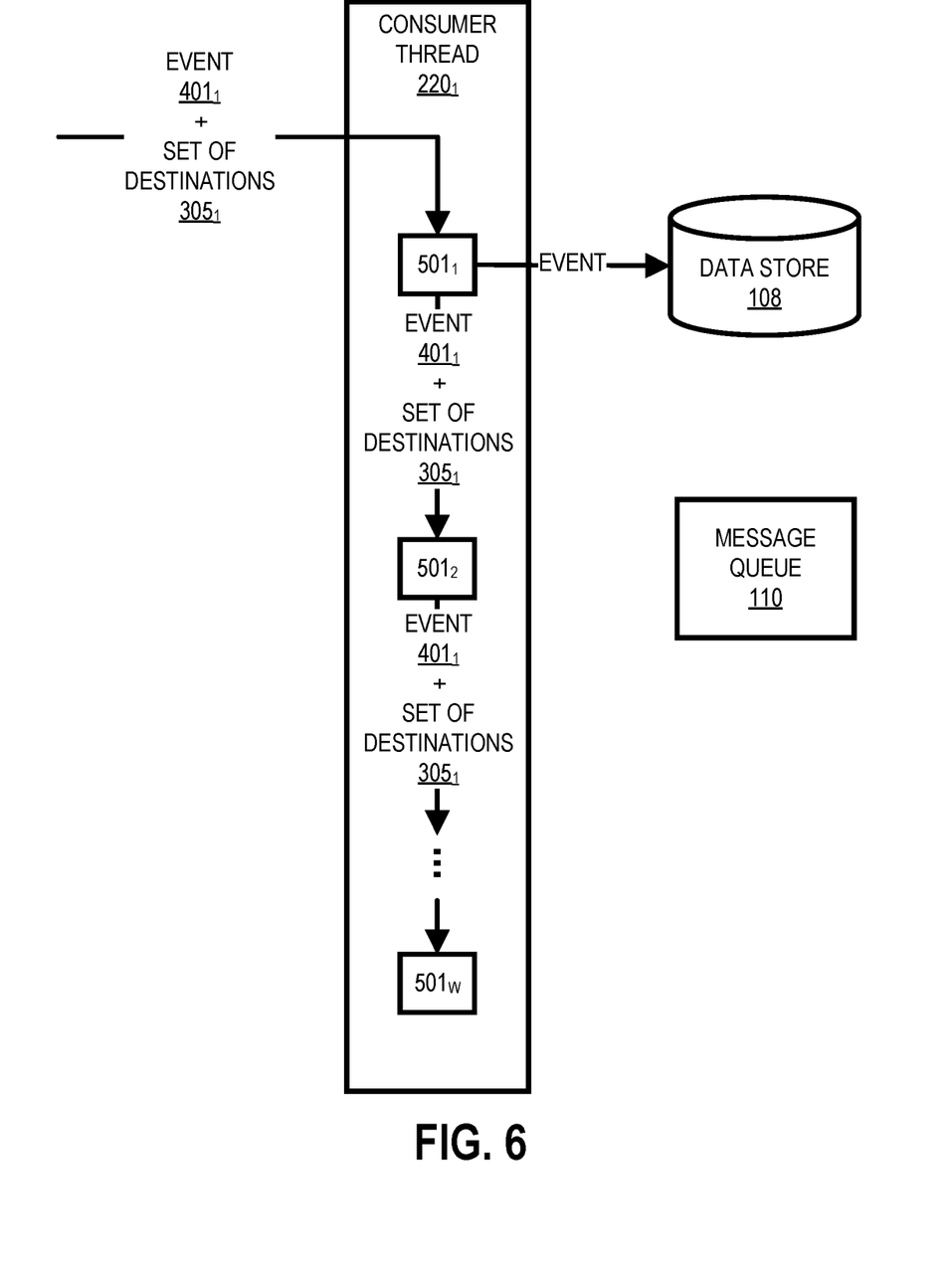
FIG. 6 shows a block diagram of a consumer thread, according to one example implementation.

FIG. 5 is a block diagram illustrating consumer threads $220_1$-$220_Y$ according to an example implementation. Each of the consumer threads $220_1$-$220_Y$ includes one or more consumer nodes $501_1$-$501_W$ for processing events 401 and corresponding set of destinations 305. Although shown in sequential order, in some embodiments, the consumer nodes $501_1$-$501_W$ may be chained together in parallel. Accordingly, consumers nodes $501_1$-$501_W$ may be in sequential order, parallel order, or in some combination of sequential and parallel order. In one implementation, each of the consumer nodes $501_1$-$501_W$ may be used for processing events 401 for routing to a particular destination (e.g., the data store 108 or the message queue 110). For example, the consumer node $501_1$ may be used for processing an event 401 for storage in the data store 108, while the consumer node $501_2$ may be used for processing an event 401 for storage in the message queue 110. In this implementation, the consumer node $501_1$ may selectively process events 401 and store the results in the data store 108, while passing the un-processed events 401 and/or the processed events 401 to the consumer node $501_2$ for selective processing and storage in the message queue 110. For example, as shown in FIG. 6, the consumer node $501_1$ may receive the event $401_1$ along with the corresponding set of destinations $305_1$ from segment $212_1$ of the bounded buffer 210. Based on the set of destinations $305_1$ (i.e., identifiers of a set of destinations), the consumer node $501_1$ may determine if processing should be performed on the event $401_1$. For example, the set of destinations $305_1$ may include only an identifier of the data store 108 (i.e., the set of destinations $305_1$={data store 108}). As noted in the above example, the consumer node $501_1$ may be used for processing events 401 for storage in the data store 108. Accordingly, in this example, the consumer node $501_1$ determines to process the event $401_1$ for storage in the data store 108 based on the set of destinations $305_1$. Together with this processing, the consumer node $501_1$ may also pass the event $401_1$ (in one or more of a processed or unprocessed form) and corresponding set of destinations $305_1$ to the consumer node $501_2$. As noted in the above example, the consumer node $501_2$ may be used for processing events 401 for storage in the message queue 110. However, since the set of destinations $305_1$ associated with the event $401_1$ only includes the data store 108, the consumer node $501_2$, which processes events 401 for the message queue 110, may forward the event $401_1$ and the set of destinations $305_1$ to the next consumer node 501 in the consumer thread $220_1$ (in one or more of a processed or unprocessed form) and consequent storage in the message queue 110. This selective processing may be performed by each consumer node $501_1$-$501_W$ in each consumer thread $220_1$-$220_Y$ such that consumer nodes $501_1$-$501_W$ process events 401 only according to their associated destination.

Figure 7:
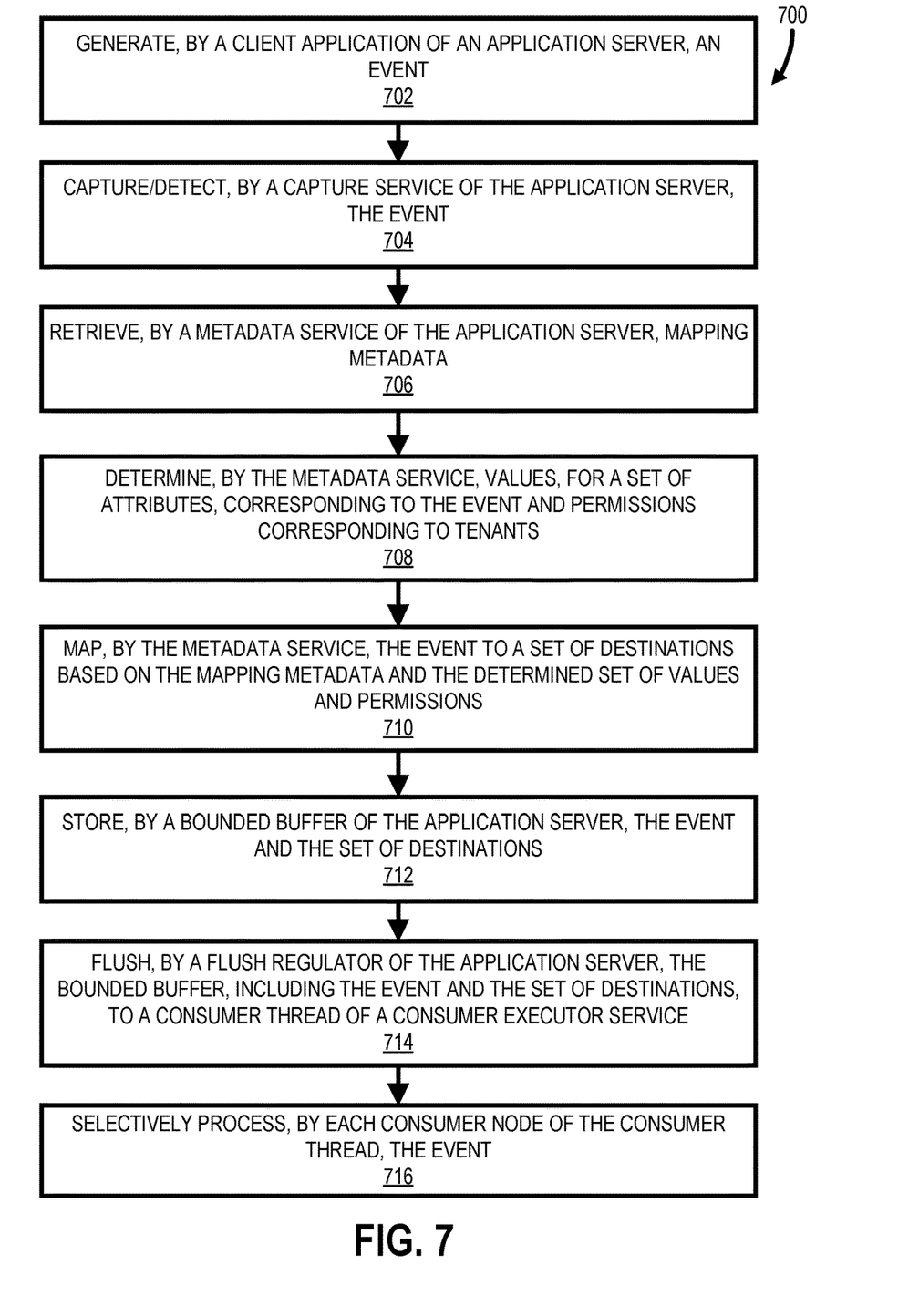
FIG. 7 shows a method for selective processing of events for routing to a set of destinations associated with the events, according to one example implementation.

Turning now to FIG. 7, a method 700 according to one implementation will be described for dynamically configuring routing of events 401 to sets of destinations 305 based on mapping metadata 112. In particular, consumer nodes 501 of consumer threads 220 may selectively process events 401 for routing to a set of destinations 305 based on the mapping metadata 112. The operations in the flow diagram of FIG. 7 will be described with reference to the exemplary implementations of the other figures. However, it should be understood that the operations of the flow diagram can be performed by implementations other than those discussed with reference to the other figures, and the implementations discussed with reference to these other figures can perform operations different than those discussed with reference to the flow diagrams.

Although described and shown in FIG. 7 in a particular order, the operations of the method 700 are not restricted to this order. For example, one or more of the operations of the method 700 may be performed in a different order or in partially or fully overlapping time periods. Accordingly, the description and depiction of the method 700 is for illustrative purposes and is not intended to restrict to a particular implementation.

As shown in FIG. 7, the method 700 may commence at operation 702 with a client application 202 generating an event 401. For example, as described above, an application or service running on a client device $102_1$-$102_N$ may interact with the client application 202 and, based on this interaction, an event 401 may be generated at operation 702. The event generated at operation 702 may be associated with values for a set of attributes 301 that describe the event 401. For example, as shown in FIG. 3, the set of attributes 301 may include an event type 301A and a location 301B.

At operation 704, the capture service 204 may detect the event 401 generated at operation 702. In one implementation, detection of the event 401 may be caused by the capture service 204 actively monitoring the client application 202, while in other implementations the client application 202 may report the event 401 to the capture service 204 when the event 401 is generated.

At operation 706, the metadata service 206 may retrieve mapping metadata 112 at runtime of the application server 104. In some embodiments, the mapping metadata 112 may be retrieved from within the application server (e.g., the mapping metadata 112 was set/determined at compile time of the application server 104 and the mapping metadata 112 is retrieved from storage/memory) in other embodiments, the mapping metadata 112 may be retrieved or passed to the application server 104 at runtime of the application server 104. The mapping metadata 112 maps values of the set of attributes 301 for events 401 along with permissions associated with tenants to sets of destinations 305. For example, as shown in FIG. 3, each set of values for the attributes 301 and permissions 303 may correspond to a set of destinations 305. The set of destinations 305 may correspond to locations the event 401 will be routed/stored once the event 401 has been processed by the application server 104. In the example computing environment 100 of FIG. 1, the set of destinations 305 corresponds to some permutation of the data store 108 and the message queue 110. However, in other implementations, more or fewer destinations may be included in the sets of destinations 305.

At operation 708, the metadata service 206 determines one or more values, for the set of attributes 301, corresponding to the event captured at operation 704, and permissions 303, corresponding to tenants. The values for the set of attributes 301 describe the event 401 and may include the attributes 301 shown in FIG. 3. For example, the set of attributes 301 may include an event type 301A (e.g., an API event, a login event, etc.) and a location 301B (e.g., a geographic location that the event was generated).

At operation 710, the metadata service 206 may map the event 401 captured at operation 704 to a set of destinations 305 based on the mapping metadata 112 received at operation 706 and values for the set of attributes 301 and permissions 303 determined at operation 708. For example, using the example mapping metadata 112 shown in FIG. 3, for a login event (i.e., event type 301A=login) generated in Texas (i.e., location 301B=Texas), the set of destinations 305 for this event consists of data store 108 and message queue 110 for a tenant with permissions A (i.e., permissions 303=permissions A) while the set of destinations 305 for this event consists of data store 108 for a tenant with permissions B (i.e., permissions 303=permissions B). As noted above, permission 303 associated with a tenant may be adjusted during runtime of the application server 104 such that a first event with the set of attributes 301 may be associated with a first set of destinations for a tenant while a second event with the set of attributes 301 may be associated with a second set of destinations for the same tenant. In this example, the permissions 303 associated with the tenant were altered between detection of the first event and the second event.

At operation 712, the event together with the set of destinations determined at operation 710 are stored in a segment 212 of the bounded buffer 210. For example, as shown in FIG. 4, the event $401_1$ and set of destinations $305_1$ may be stored in segment $212_1$ of the bounded buffer 210. As noted above, the event $401_1$ may be described by values of a set of attributes 301. Accordingly, the values for the set of attributes 301 of the event $401_1$ and the set of destinations 305 associated with the event $401_1$ may be stored in a segment 212 of the bounded buffer 210 at operation 712.

At operation 714, the buffer flush regulator 214 may flush the bounded buffer 210, including the segment 212 containing the event 401 captured at operation 704 and the set of destinations 305 associated with the event 401, to a consumer executor service 216. In particular, the event 401 and the set of destinations 305 associated with the event 401 are flushed to a consumer thread 220 of a thread pool 218. In one implementation, logic associated with bounded buffer 210 monitors the load on bounded buffer 210 and provides a notification to the buffer flush regulator 214 when the number of events 401 and corresponding sets of destinations 305 stored in the bounded buffer 210 reaches a predefined limit (e.g., 80% full) or when a predefined amount of time has passed since the contents of the bounded buffer 210 were last flushed to the consumer executor service 216 (e.g., ten seconds).

At operation 716, each consumer node 501 of the consumer thread 220 that received the event 401 and the set of destinations 305 may selectively process the event 401. For example, as shown in FIG. 6, the event $401_1$ is received by the consumer node $501_1$ of the consumer thread $220_1$. The consumer node $501_1$ may process the event $401_1$ for routing to the data store 108 when the set of destinations $305_1$ associated with the event $401_1$ includes the data store 108. In the example shown in FIG. 6, the set of destinations $305_1$ includes the data store 108. Thus, the consumer node $501_1$ process the event $401_1$ for routing to the data store 108 and passes the unprocessed and/or the processed event $401_1$ to the next consumer node 501 (i.e., the consumer node $501_2$). Similar to the consumer node $501_1$, the consumer node $501_2$ may process the event $401_1$ for routing to the message queue 110 when the set of destinations $305_1$ associated with the event $401_1$ includes the message queue 110. In the example shown in FIG. 6, the set of destinations $305_1$ does not include the message queue 110. Thus, the consumer node $501_2$ does not process the event $401_1$ for routing to the message queue 110, but still passes the unprocessed event $401_1$ to the next consumer node 501. Although shown in sequential order, in some embodiments, the consumer nodes $501_1$-$501_W$ may be chained together in parallel. Accordingly, consumers nodes $501_1$-$501_W$ may be in sequential, parallel, or in some combination of sequential and parallel order.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code to be executed into volatile memory, the code/data may be provided directly to the processor(s) (e.g., loaded into a cache of the processor(s)); in other words, this non-volatile memory operates as both long term storage and main memory, and thus the electronic device may have no or only a small amount of DRAM for main memory. In addition to machine-readable storage media, typical electronic devices can transmit code and/or data over a machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 8A:
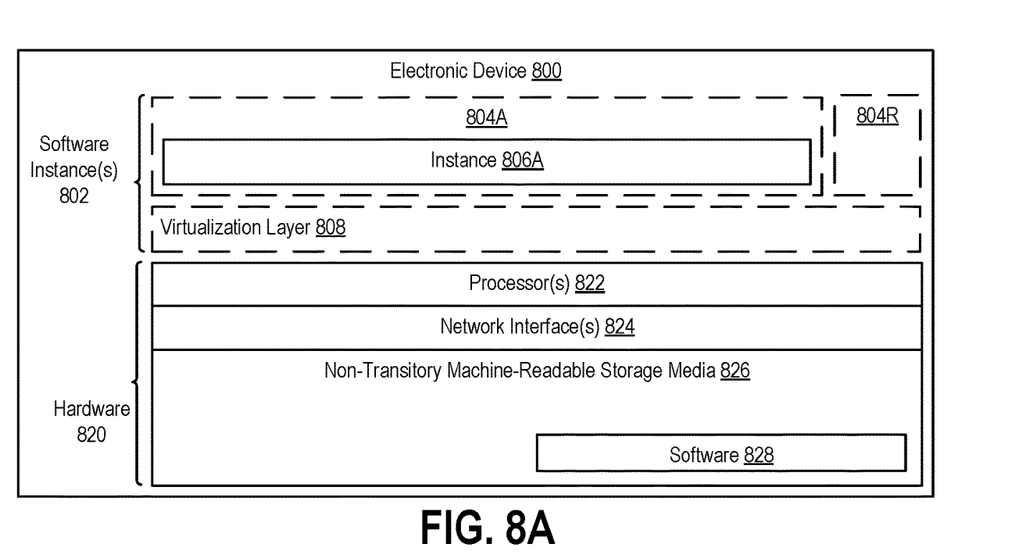
FIG. 8A illustrates an electronic device according to one example implementation.

FIG. 8A is a block diagram illustrating an electronic device 800 according to some example implementations. FIG. 8A includes hardware 820 comprising a set of one or more processor(s) 822, a set of one or more network interfaces 824 (wireless and/or wired), and non-transitory machine-readable storage media 826 having stored therein software 828 (which includes instructions executable by the set of one or more processor(s) 822). Each of the previously described client devices 102 and the application server 104 may be implemented in one or more electronic devices 800. In one implementation: 1) each of the client devices 102 is implemented in a separate one of the electronic devices 800 (e.g., in user electronic devices operated by users where the software 828 represents the software to implement client devices 102 to interface with the application server 104 (e.g., a web browser, a native client, a portal, a command-line interface, and/or an application program interface (API) based upon protocols such as Simple Object Access Protocol (SOAP), Representational State Transfer (REST), etc.)); 2) the application server 104 is implemented in a separate set of one or more of the electronic devices 800 (e.g., a set of one or more server electronic devices where the software 828 represents the software to implement the application server 104); and 3) in operation, the electronic devices implementing the client devices 102 and the application server 104 would be communicatively coupled (e.g., by a network) and would establish between them (or through one or more other layers) connections for submitting event data to the application server 104. Other configurations of electronic devices may be used in other implementations (e.g., an implementation in which the end user client and the application server 104 are implemented on a single electronic device 800).

In electronic devices that use compute virtualization, the set of one or more processor(s) 822 typically execute software to instantiate a virtualization layer 808 and software container(s) 804A-R (e.g., with operating system-level virtualization, the virtualization layer 808 represents the kernel of an operating system (or a shim executing on a base operating system) that allows for the creation of multiple software containers 804A-R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 828 (illustrated as instance 806A) is executed within the software container 804A on the virtualization layer 808. In electronic devices where compute virtualization is not used, the instance 806A on top of a host operating system is executed on the "bare metal" electronic device 800. The instantiation of the instance 806A, as well as the virtualization layer 808 and software containers 804A-R if implemented, are collectively referred to as software instance(s) 802.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 8B:
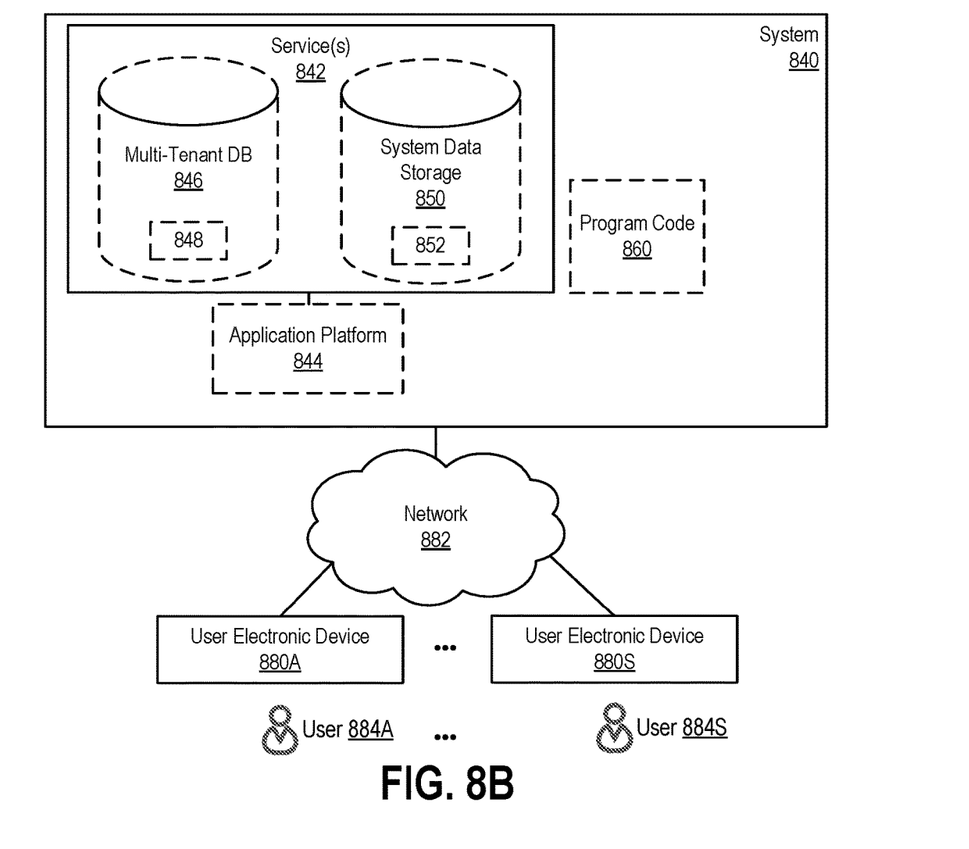
FIG. 8B shows a block diagram of an environment where the computing environment and the application server may be implemented according to one example implementation.

FIG. 8B is a block diagram of an environment where a computing environment 100 may be deployed, according to some implementations. A system 840 includes hardware (a set of one or more electronic devices) and software to provide service(s) 842, including the application server 104. The system 840 is coupled to user electronic devices 880A-S over a network 882. The service(s) 842 may be on-demand services that are made available to one or more of the users 884A-S working for one or more other organizations (sometimes referred to as outside users) so that those organizations do not need to necessarily be concerned with building and/or maintaining a system, but instead makes use of the service(s) 842 when needed (e.g., on the demand of the users 884A-S). The service(s) 842 may communication with each other and/or with one or more of the user electronic devices 880A-S via one or more Application Programming Interface (s) (APIs) (e.g., a Representational State Transfer (REST) API). The user electronic devices 880A-S are operated by users 884A-S.

In one implementation, the system 840 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 840 may include an application platform 844 that enables PAAS for creating, managing, and executing one or more applications developed by the provider of the application platform 844, users accessing the system 840 via one or more of user electronic devices 880A-S, or third-party application developers accessing the system 840 via one or more of user electronic devices 880A-S.

In some implementations, one or more of the service(s) 842 may utilize one or more multi-tenant databases 846 for tenant data 848, as well as system data storage 850 for system data 852 accessible to system 840. In certain implementations, the system 840 includes a set of one or more servers that are running on server electronic devices and that are configured to handle requests for any authorized user associated with any tenant (there is no server affinity for a user and/or tenant to a specific server). The user electronic devices 880A-S communicate with the server(s) of system

840 to request and update tenant-level data and system-level data hosted by system 840 and, in response, the system 840 (e.g., one or more servers in system 840) automatically may generate one or more Structured Query Language (SQL) statements (e.g., one or more SQL queries) that are designed to access the desired information from the one or more multi-tenant database 846 and/or system data storage 850.

In some implementations, the service(s) 842 are implemented using virtual applications dynamically created at run time responsive to queries from the user electronic devices 880A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 844 includes an application setup mechanism that supports application developers' creation and management of applications, which may be saved as metadata by save routines. Invocations to such applications, including applications of the application server 104, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 882 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 840 and the user electronic devices 880A-S.

Each user electronic device 880A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 840. For example, the user interface device can be used to access data and applications hosted by system 840, and to perform searches on stored data, and otherwise allow a user 884 to interact with various GUI pages that may be presented to a user 884. User electronic devices 880A-S might communicate with system 840 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 880A-S might include an HTTP client, commonly referred to as a "browser," for sending and receiving HTTP messages to and from server(s) of system 840, thus allowing users 884 of the user electronic device 880A-S to access, process and view information, pages and applications available to it from system 840 over network 882.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting. For example, while implementations have been described in relation to two destinations for events (e.g., the data store 108 and the message queue 110), other implementations may include additional or alternative destinations.

What is claimed is:

1. A method for dynamically routing of events to destinations based on mapping metadata, the method comprising:
    detecting, by a capture service of an application server, an event associated with values for one or more attributes that describe the event;
    mapping, by a metadata service of the application server, the event to a set of destinations based on the mapping metadata received by the application server at runtime, the values of the one or more attributes of the event, and permissions associated with a tenant;
    storing, by a buffer of the application server, the event and the set of destinations; and
    selectively processing, by each consumer node in a plurality of consumer nodes of the application server, the event based on the set of destinations.

2. The method of claim 1, wherein a first consumer node in the plurality of consumer nodes is associated with a first destination and a second consumer node in the plurality of consumer nodes is associated with a second destination.

3. The method of claim 2, wherein the selectively processing comprises:
    based on determining that the set of destinations includes the first destination, processing the event by the first consumer node to produce a processed event, routing the processed event to the first destination, and passing the event to the second consumer node.

4. The method of claim 2, wherein the selectively processing comprises:
    based on determining that the set of destinations does not include the first destination, passing the event from the first consumer node to the second consumer node without processing by the first consumer node.

5. The method of claim 2, wherein the set of destinations includes one or more of a long-term storage location and a short-term storage location.

6. The method of claim 1, wherein the one or more attributes includes one or more of a type of the event and a location from which the event was generated.

7. An application server for dynamically routing of events to destinations based on mapping metadata, the application server comprising:
    a capture service to detect an event associated with values for one or more attributes that describe the event;
    a metadata service to map the event to a set of destinations based on the mapping metadata received by the application server at runtime, the values of the one or more attributes of the event, and permissions associated with a tenant;
    a buffer to store the event and the set of destinations; and
    a plurality of consumer nodes, wherein each consumer node in the plurality of consumer nodes is to selectively process the event based on the set of destinations.

8. The application server of claim 7, wherein a first consumer node in the plurality of consumer nodes is associated with a first destination and a second consumer node in the plurality of consumer nodes is associated with a second destination.

9. The application server of claim 8, wherein the selectively processing comprises:
    when the set of destinations includes the first destination, processing the event by the first consumer node to produce a processed event, routing the processed event to the first destination, and passing the event to the second consumer node.

10. The application server of claim 8, wherein the selectively processing comprises:
    when the set of destinations does not include the first destination, passing the event from the first consumer node to the second consumer node without processing by the first consumer node.

11. The application server of claim 8, wherein the set of destinations includes one or more of a long-term storage location and a short-term storage location.

12. The application server of claim 7, wherein the one or more attributes includes one or more of a type of the event and a location from which the event was generated.

13. A non-transitory machine-readable storage medium that stores instructions, which when executed by a processor of a computing system, cause the computing system to:
    detect an event, wherein the event is associated with values for one or more attributes that describe the event;
    map the event to a set of destinations based on mapping metadata received by the computing system at runtime, the values of the one or more attributes of the event, and permissions associated with a tenant;
    store, in a buffer, the event and the set of destinations; and
    selectively process, by each consumer node in a plurality of consumer nodes, the event based on the set of destinations.

14. The non-transitory machine-readable storage medium of claim 13, wherein a first consumer node in the plurality of consumer nodes is associated with a first destination and a second consumer node in the plurality of consumer nodes is associated with a second destination.

15. The non-transitory machine-readable storage medium of claim 14, wherein the selectively processing comprises:
    when the set of destinations includes the first destination, processing the event by the first consumer node to produce a processed event, routing the processed event to the first destination, and passing the event to the second consumer node.

16. The non-transitory machine-readable storage medium of claim 14, wherein the selectively processing comprises:
    when the set of destinations does not include the first destination, passing the event by the first consumer node to the second consumer node without processing by the first consumer node.

17. The non-transitory machine-readable storage medium of claim 13, wherein the one or more attributes includes one or more of a type of the event and a location from which the event was generated.

* * * * *